United States Patent
Ford et al.

(10) Patent No.: US 10,809,444 B2
(45) Date of Patent: Oct. 20, 2020

(54) PLANAR DISPLAY WITH ACTIVELY-CONTROLLABLE VIEWING DIRECTIONS

(71) Applicant: The Regents of the University of California, Oakland, CA (US)

(72) Inventors: Joseph Ford, Solana Beach, CA (US); William Mellette, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 95 days.

(21) Appl. No.: 16/028,295

(22) Filed: Jul. 5, 2018

(65) Prior Publication Data

US 2019/0018181 A1    Jan. 17, 2019

Related U.S. Application Data

(63) Continuation of application No. 15/025,170, filed as application No. PCT/US2014/057873 on Sep. 26, 2014, now Pat. No. 10,048,429.

(60) Provisional application No. 61/883,000, filed on Sep. 26, 2013.

(51) Int. Cl.
| | |
|---|---|
| *G02F 1/1335* | (2006.01) |
| *G02F 1/13357* | (2006.01) |
| *F21V 8/00* | (2006.01) |
| *G02B 3/00* | (2006.01) |

(52) U.S. Cl.
CPC ......... *G02B 6/0053* (2013.01); *G02B 3/0056* (2013.01); *G02B 6/0036* (2013.01); *G02F 1/133514* (2013.01); *G02F 1/133526* (2013.01); *G02B 6/002* (2013.01); *G02B 6/003* (2013.01); *G02B 6/0028* (2013.01); *G02B 6/0048* (2013.01); *G02F 1/133615* (2013.01)

(58) Field of Classification Search
CPC .. G02B 6/0053; G02B 3/0056; G02B 6/0036; G02B 6/002; G02B 6/0028; G02B 6/003; G02B 6/0048; G02F 1/133514; G02F 1/133526; G02F 1/133615
See application file for complete search history.

(56) References Cited

U.S. PATENT DOCUMENTS

| | | | |
|---|---|---|---|
| 5,452,385 A | 9/1995 | Izumi | |
| 5,647,036 A | 7/1997 | Deacon et al. | |
| 7,006,173 B1* | 2/2006 | Hiyama | G02F 1/133536 349/61 |
| D528,673 S | 9/2006 | Maxik et al. | |
| 7,234,844 B2 | 6/2007 | Bolta et al. | |
| D553,267 S | 10/2007 | Yuen | |
| D587,832 S | 3/2009 | Bergmann et al. | |
| 7,744,259 B2 | 6/2010 | Walczak et al. | |
| 7,817,885 B1 | 10/2010 | Moore et al. | |
| 7,982,823 B1 | 7/2011 | Feng | |

(Continued)

OTHER PUBLICATIONS

Chang et al., "Dot-pattern design of a light guide in an edge-lit backlight using a regional partition approach," Optical Engineering 46(4), 9 pages.

(Continued)

*Primary Examiner* — Huyen L Ngo
(74) *Attorney, Agent, or Firm* — Mintz Levin Cohn Ferris Glovsky and Popeo, P.C.

(57) ABSTRACT

In one aspect, there is provided a display. The display may include a waveguide layer, a first active layer, a redirecting layer, and a lenset layer.

10 Claims, 11 Drawing Sheets

(56) References Cited

U.S. PATENT DOCUMENTS

| | | | |
|---|---|---|---|
| 8,408,775 B1 | 4/2013 | Coleman | |
| 2004/0161192 A1 | 8/2004 | Hamano | |
| 2005/0078374 A1* | 4/2005 | Taira | G02B 5/1814 |
| | | | 359/569 |
| 2007/0058258 A1* | 3/2007 | Mather | G02B 30/27 |
| | | | 359/619 |
| 2007/0279352 A1 | 12/2007 | Tanaka | |
| 2008/0089068 A1* | 4/2008 | Mimura | B29D 11/0074 |
| | | | 362/292 |
| 2010/0079843 A1 | 4/2010 | Derichs et al. | |
| 2010/0283941 A1* | 11/2010 | Nemoto | B29D 11/00298 |
| | | | 349/63 |
| 2011/0069249 A1* | 3/2011 | Shiau | G02B 6/0053 |
| | | | 349/62 |
| 2011/0128471 A1* | 6/2011 | Suckling | G02B 6/0041 |
| | | | 349/62 |
| 2012/0098875 A1* | 4/2012 | Shinkai | G02B 6/0036 |
| | | | 345/690 |
| 2013/0033901 A1* | 2/2013 | Nishitani | G02B 6/0036 |
| | | | 362/613 |
| 2014/0036176 A1* | 2/2014 | Shinkai | G02B 6/0043 |
| | | | 349/15 |
| 2014/0160388 A1* | 6/2014 | Wu | G02F 1/136286 |
| | | | 349/43 |
| 2015/0253487 A1 | 9/2015 | Nichol | |
| 2017/0255020 A1* | 9/2017 | Tam | G06F 3/013 |

OTHER PUBLICATIONS

Di Feng et al., "High quality light guide plates that can control the illumination angle based on microprism structures," Applied Physics Letters 85(24):6016-6018 (2004).

Fournier, Florian, et al., "Method to improve spatial uniformity with lightpipes." *Optics letters* 33.11 (2008): 1165-1167.

Hallas et al., "Two-axis solar tracking accomplished through small lateral translations," Applied Optics, 51(25):6117-6124 (2012).

J. H. Karp, et al., "Orthogonal and secondary concentration in planar micro-optic solar collectors," Optics Express, vol. 19, Issue S4, pp. A673-A685 (2011).

Jin-Ren Yan, et al., "Edge-Lighting Light Guide Plate Based on Micro-Prism for Liquid Crystal Display," J. Display Technology, vol. 5, Issue 9, pp. 355-357, Sep. 2009.

Karp et al., "Planar micro-optic solar concentrator," Optics Express 18(2):1122-1133 (2010).

Okumura T., et al., "Highly-efficient backlight for liquid crystal display having no optical films," Appl. Phys. Lett. 2003, Vo. 83. No. 13, pp. 2515-2518, 2003.

* cited by examiner

PLANAR DISPLAY WITH ACTIVELY-CONTROLLABLE VIEWING DIRECTIONS

CROSS-REFERENCE TO RELATED APPLICATION

This Application is a Continuation of Application 15/025,170 filed on Sep. 26, 2014, entitled "ILLUMINATOR WITH ADJUSTABLE BEAM DIRECTION AND DIVERGENCE," which is a national-phase entry of Patent Cooperation Treaty Application No. PCT/US2014/057873, entitled "MICROSTRUCTURED WAVEGUIDE ILLUMINATOR," filed Sep. 26, 2014, which claims priority to U.S. Provisional Patent Application Ser. No. 61/883,000, entitled "MICROSTRUCTURED WAVEGUIDE ILLUMINATOR," filed on Sep. 26, 2013, the contents of which are incorporated by reference in their entirety herewith.

TECHNICAL FIELD

The subject matter disclosed herein relates to sources of lighting and, in particular, light-emitting diode sources with adjustable directionality for general lighting and for display backlighting.

BACKGROUND

Light emitting diodes (LEDs) are considered by many to have superior electrical to optical energy conversion efficiency as well as longer lifetimes compared to conventional lighting devices such as fluorescent lights and incandescent lights. Conventional lighting devices are designed to either provide directional illumination or diffuse illumination, but once designed and manufactured, conventional lighting cannot switch between directional and diffuse illumination. Moreover, the direction of the illumination cannot be internally adjusted.

SUMMARY

In one aspect, there is provided an apparatus. The apparatus may include a waveguide layer to guide an optical beam, and a lenslet layer, coupled to a surface of the waveguide layer, to focus a portion of the optical beam. The apparatus may further include a first active layer, coupled to another surface of the waveguide layer, to allow the portion of the optical beam to decouple from the waveguide layer by passing through the first active layer in at least one selectable region of the first active layer. The apparatus may further include a redirecting layer, coupled to or proximate to the first active layer, to redirect the portion of the optical beam decoupled from the waveguide towards the lenslet layer.

In some variations, one or more of the features disclosed herein including the following features can optionally be included in any feasible combination. The apparatus may include a second active layer to select an intensity of the portion of the optical beam decoupled from the waveguide layer. The second active layer may further select a color from a color filter array for the portion of the optical beam decoupled from the waveguide layer. The redirected portion of the optical beam decoupled from the waveguide layer may be steered in a predetermined direction by adjusting the selectable regions of the first active layer. One or more of the first active layer and the second active layer may comprise a liquid crystal material. The redirecting layer may comprise prism decouplers. The lenslet layer may comprise a plurality of lenses configured in an array. The optical beam may propagate in a direction that is substantially parallel to the waveguide, the first active layer, the second active layer, the redirecting layer, and the lenslet layer. The apparatus may be configured as a display and may include a face tracker to determine at least a direction from one of the plurality of lenses to an eye of a user.

The above-noted aspects and features may be implemented in systems, apparatuses, methods, and/or computer-readable media depending on the desired configuration. The details of one or more variations of the subject matter described herein are set forth in the accompanying drawings and the description below. Features and advantages of the subject matter described herein will be apparent from the description and drawings, and from the claims. In some exemplary implementations, one of more variations may be made as well as described in the detailed description below and/or as described in the following features.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
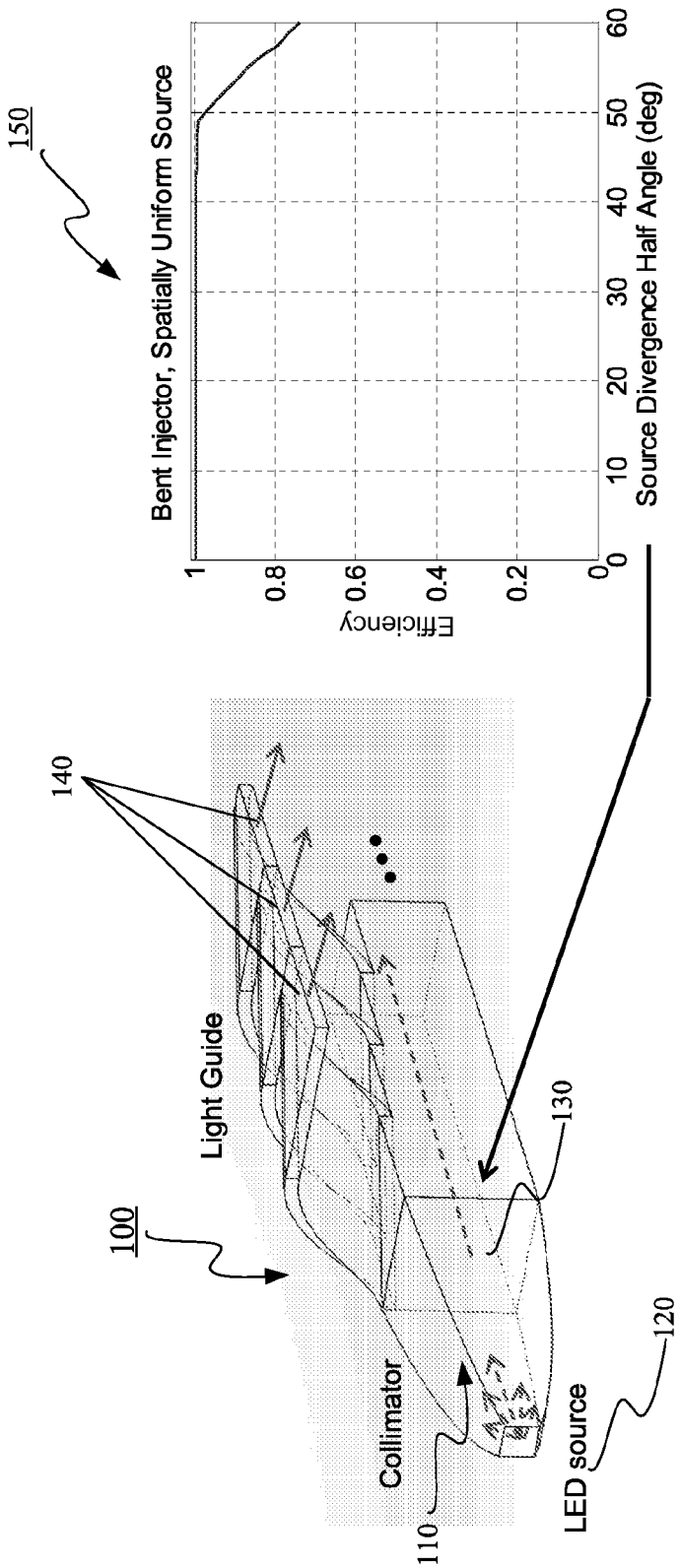
FIG. 1 depicts an example of an apparatus for collimating light from a diffuse source that redirects portions of the beam to provide coupling to a thin planar waveguide, in accordance with some example implementations.

Like labels are used to refer to same or similar items in the drawings.

DETAILED DESCRIPTION

Methods and apparatuses are disclosed including waveguides and micro-optic structures for backlights that controllably route light from one or more small area bright sources to evenly illuminate the surface of a large panel. The methods and apparatuses may be used to make inexpensive light-emitting diode (LED) light fixtures for office lighting. The light fixtures may be electrically or mechanically controlled to adjust the direction and divergence of the emitted light. In some example implementations, the direction of light emitted from regions of a liquid crystal display may be controlled in real-time. Real-time control may provide energy efficiency, viewing privacy, and/or a multi-user three-dimensional display, without the use of special glasses.

In accordance with some example implementations, an apparatus and method to provide lighting from a planar surface is disclosed. The angle of the lighting from the surface may be controlled. In some example implementations, the angle may be fixed by design of a waveguide sheet. In some example implementations, the angle may be continuously adjustable by mechanical positioning of a lenslet array or by electronic control of an active material, such as a liquid crystal material.

The fixed or adjustable beam angle may be controlled by periodic micro-optic structures in a waveguide and by lenslets. The direction of the light emission may be controlled by the position of the micro-optic microstructures (e.g., also referred to as "extraction" structures) relative to a periodic array of lenslets. The lenslets may be separate from the waveguide. The emission direction of a fixed beam apparatus may be determined by the physical shape of the lenslets and the shape and relative position of the waveguide light extraction structures. The position of the lenslets relative to the waveguide extraction features, and so the direction of light emission, may be controlled by moving the lenslet array relative to the waveguide.

The lenslet array may be used to direct the light into a predetermined pattern, where the position and size of the output facets (or the position and focal length of the lenslets) determines the direction of emission for each region of the overall device surface. In this way, the direction of emission and divergence angle a planar LED light fixture may be controlled. The control may be mechanical, for example by using a pair or knobs or screws, or it may be electro-mechanical, for example by using a motor.

In some implementations, each element of an extraction microstructure array is electrically controlled. For example, a liquid crystal panel in proximity to a waveguide may be electrically controlled such that the refractive index of localized regions of the liquid crystal panel have a refractive index that is different from other regions of the liquid crystal panel. The difference in the index of refraction at the interface between the waveguide and the surrounding volume determines the reflection at that interface, and so the difference in the index of refraction at the interface controls the light emission from that region of the waveguide. Light emitted from the waveguide may be directed by a fixed array of refractive features or a fixed array of reflective features. These features act to direct the emitted light into a direction determined by the specific area of emission from the waveguide.

By controlling the refractive index of regions of the liquid crystal panel, the liquid crystal panel may determine the resulting beam angle in real-time. In this way, a liquid crystal display may be produced that provides a visual display that is only visible in a particular direction. The display may not be viewed from other directions. In some implementations, controlling the viewing angle provides privacy to a viewer. Controlling the viewing angle also reduces the energy required for the display. In some implementations, controlling the viewing angle may be used to provide different images to each of the two eyes of a viewer to enable a three-dimensional display.

A face-tracker and/or eye-tracker may be used to track the positions of a viewer's face and/or eyes to enable viewing as the viewer and/or display moves. The face-tracker or eye-tracker may be implemented using a camera mounted near the display. A face-tracker may perform face-recognition to locate the viewer's head. An eye-tracker may locate one or both of the viewer's eyes. The location of the viewer's head and/or eyes may be used to adjust properties of the display. Properties of the display that may be controlled include the divergence angle of the light from the display and the total illuminating power of the light. These properties may be adjusted to reduce the energy consumption of the display and/or limit access to particular viewing angles (viewers). The viewing angle and intensity may be adjusted in real-time, in response to the number and location of viewers.

FIG. 1 depicts an illumination device 100 that provides a planar light output in accordance with some implementations. The illumination device may expand and partially collimate the light with a collimator 110 from a diffuse source, such as a light emitting diode 120 (labeled "LED source"). Waveguide in the illumination device may "peel off" segments of a rectangular aperture 130, re-arranging the segments 140 to be arranged to produce an extended planar light source. Diagram 150 shows an example relationship between a source divergence angle and optical coupling efficiency, in accordance with some implementations. The optical coupling efficiency is the ratio of the energy of the light source to the total light energy coupled into confined modes of the waveguide.

Figure 2:
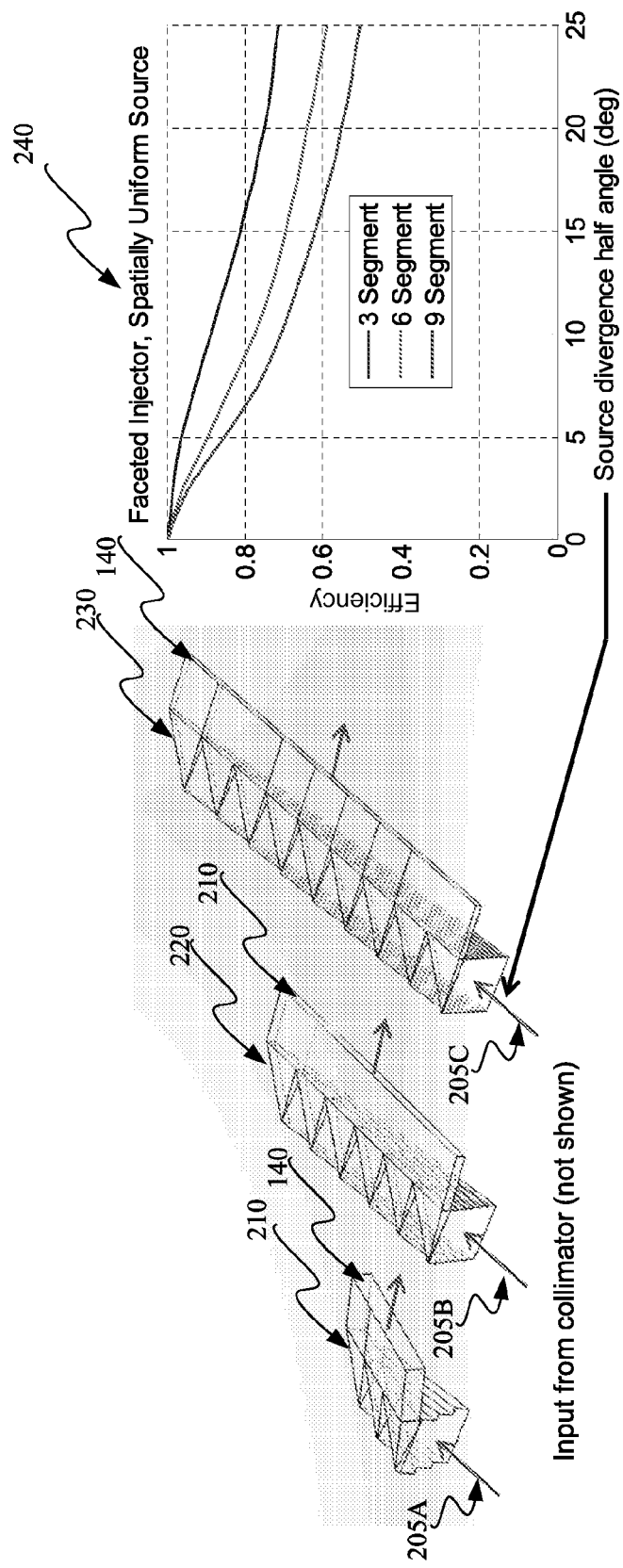
FIG. 2 depicts an example of an apparatus for redirecting portions of a beam using reflective facets to provide coupling to a thin planar waveguide, in accordance with some example implementations.

FIG. 2 depicts illumination devices 210, 220, and 230 that provide a planar light output in accordance with some implementations. Light from a collimator, such as collimator 110, enters at 205A-C into illumination device 210, 220, and 230. Reflective facets each redirect a portion of the light from the collimator to planar waveguide segments 140 arranged to produce an extended planar light source. Diagram 240 shows an example relationship between a source divergence angle and the efficiency, in accordance with some implementations.

Figure 3:
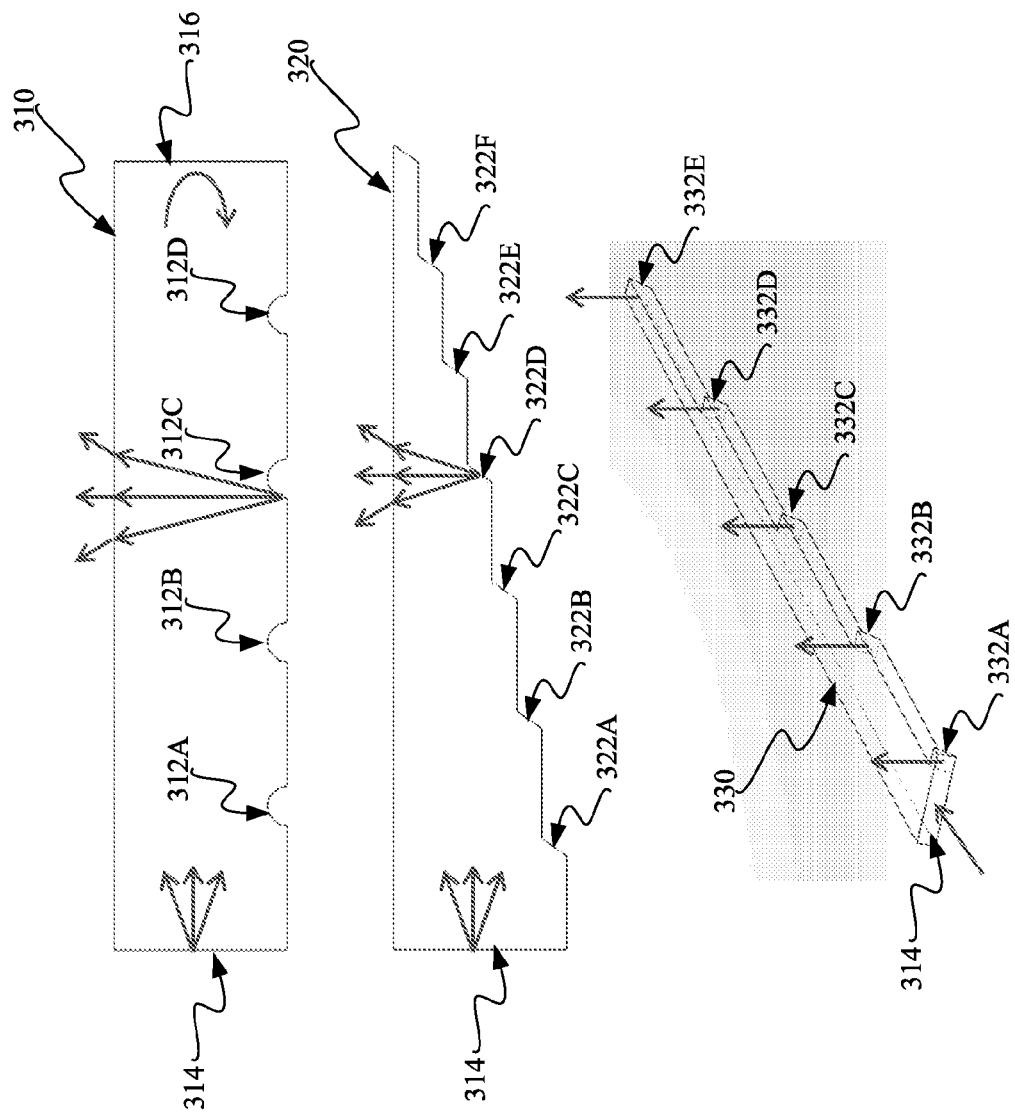
FIG. 3 depicts a waveguide with periodic features to scatter light from the waveguide, in accordance with some example implementations.

FIG. 3 depicts examples of waveguides with periodic features to scatter light in a waveguide. At 310, a waveguide is shown with periodic scattering structures. At 320, a waveguide is shown with periodic reflective surfaces. At 330, a waveguide is shown with a stepped light guide structure.

At 310, a waveguide is shown with periodic scattering structures 312A-312D. Light may be scattered from each scatterer 312A-312D (scattering from only scatterer 312C is shown). Light may be reflected from the right-side wall 316 back to the source at the left-side wall 314. In some implementations, no reflection occurs at the right side-wall 316. In these implementations, the spacing between scatterers 312A-312D may vary based on the distance that the scatterer is from the source 314. For example, as the distance between the source and the scatterer increases, the incremental distance to the next scatterer may decrease (or increase). At 310, equal spacing between scatterers 312A-312D is shown. At 310, four scatterers are shown but any other number of scatterers may used as well.

At 320, periodic reflective surfaces 322A-322F which may be mirrored or reflect due to total internal reflection, redirect light in the waveguide (reflection from only reflector 322C is shown). The waveguide cross section may decrease with each ejection site. The optical intensity remains constant throughout the waveguide while the modal volume decreases as a function of propagation distance. Ejection of all the light entering the waveguide may occur in a single pass. For example, all the light or nearly all the light entering at 314 may be reflected by one of the reflective surfaces 322A-322F.

At 330, a stepped light guide uniformly redirects light to individual ejection sites 332A-332E (light reflected from each ejection site 332A-332E is shown). Light may makes one pass through the structure before being ejected by a facet. For example, all the light or nearly all the light entering at 314 may be ejected by one of the ejection sites 332A-332E. Each ejection site may subtend the entire thickness of the light guide 330.

Figure 4:
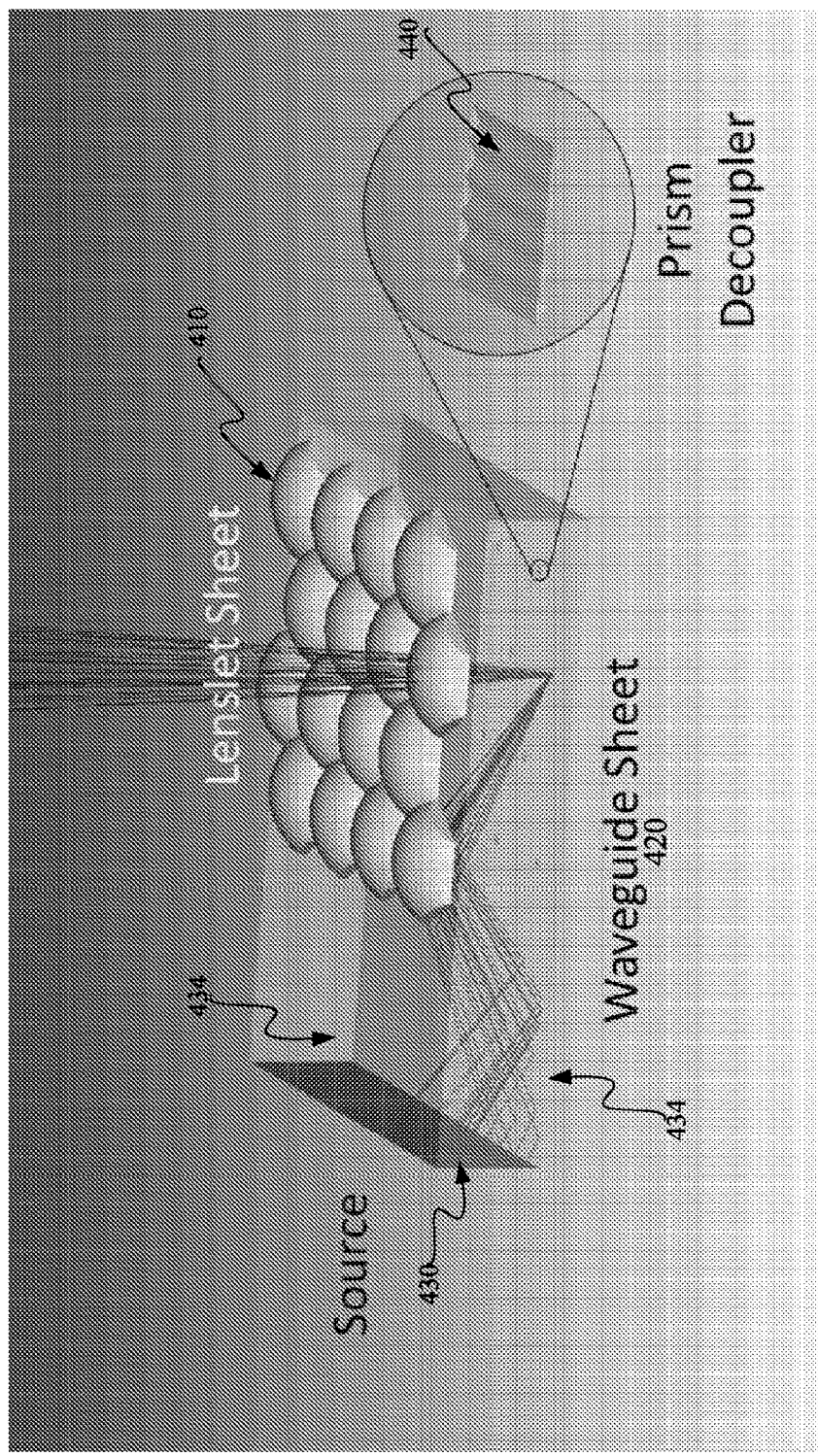
FIG. 4 depicts lenslet sheet and waveguide sheet, in accordance with some example implementations.

FIG. 4 depicts a lenslet sheet 410 and waveguide sheet 420, in accordance with some implementations. Light may be injected into the waveguide sheet 420 from the edges 430, the top surface 434, and/or the bottom surface 432 by injection structures that limit the angular spectrum of the injected light. For example, light injected from the left edge may be shown in FIG. 4. The waveguide sheet 420 may be bordered by air or a low refractive index cladding to permit light to be guided by total internal reflection (TIR). As light travels in the waveguide sheet 420, light interacts with small prism decouplers 440, which decouple the guided light into a narrow range of angles travelling perpendicular to the waveguide. The decoupled light may interact with the lenslet sheet 410 which is comprised of an array of refractive or reflective lenslets. The interaction of the source with a particular prism decoupler and lenslet is shown in 400.

Figure 5:
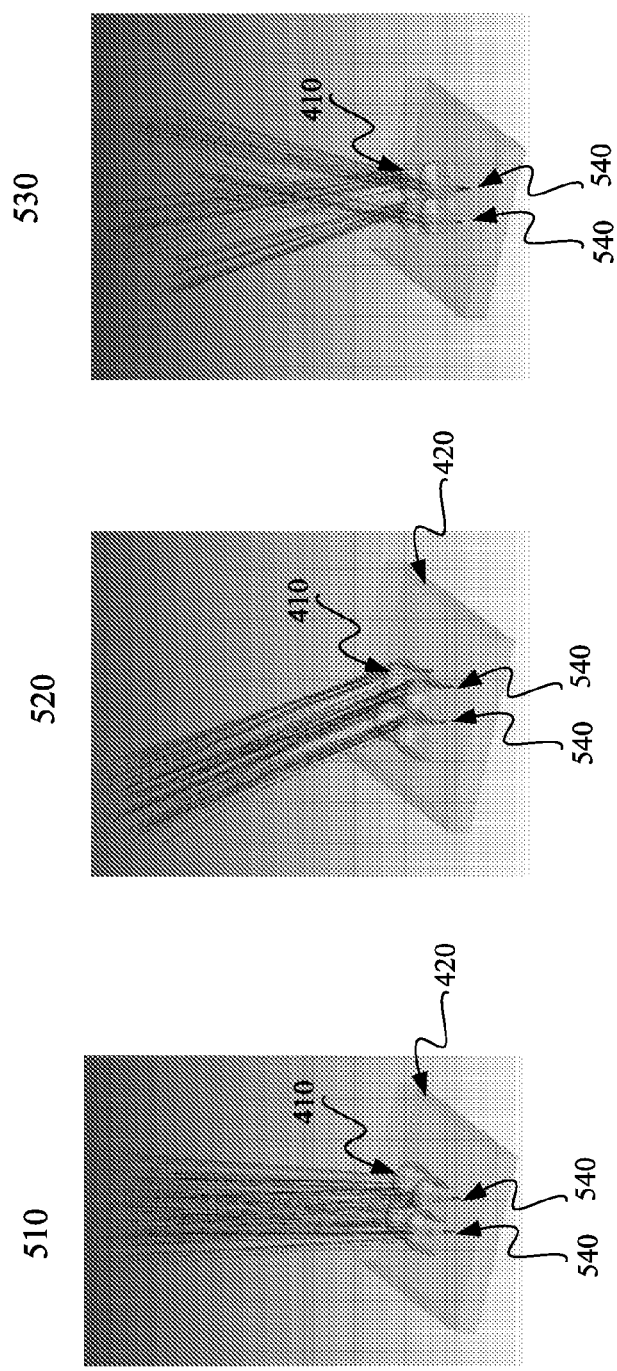
FIG. 5 depicts a lenslet array and the effects of translating and rotating the lenslet array, in accordance with some example implementations.

FIG. 5 depicts steering a beam generated from a waveguide sheet 420, prism decouplers 440, and a lenslet sheet 410 (or lenslet array). The direction and divergence of the emitted light is regulated by mechanically or electrically controlling the positions of the prism decouplers 440 relative to the lenslet sheet 410 is detailed below.

In FIG. 5, light from an extended Lambertian source (e.g., LED) may be conditioned by an injection structure for efficient coupling into planar light guide 420. The injection structure may limit the angular extent of the injected light not only to ensure total internal reflection (TIR) confinement in the waveguide 420, but also so a reduced angular extent can be leveraged during beam steering.

The waveguide 420 may direct the injected light to an ejection feature such as prism decoupler 440, where light is decoupled. Depending on the type of ejection feature, the angular extent of the light may or may not be altered. The spatial extent of the ejection features may be small relative to the lenslet aperture to limit divergence.

The ejected light may be directed to a lens in a lenslet sheet 410 whose focal plane is roughly at a corresponding ejection feature such as prism decoupler 440. In some implementations, the lens substantially collimates the light scattered from the ejection feature and directs the light in a particular direction. Light is steered by the lens depending on the radial offset between the optical axis of the lens and the ejection feature.

Partial illumination of the lens aperture may reduce aberrations and crosstalk between adjacent lenses. This may require the light propagating in the light guide to have a limited divergence and for the ejection features to maintain that divergence. Lower f-number lenses may enable a larger steering angle as well as lower crosstalk between adjacent lenslets.

At 510, a two-by-two lenslet array 510 is aligned with a two-by-two ejector array 540 so that the four beams from the four lenses in the lenslet array 510 are collimated. The combination of the four beams is also a collimated beam. At 520, translation of lenslet array 510 relative to ejector array 540 enables steering of each of the four beams in the same direction. At 530, rotation of lenslet array 510 relative to ejector array 540 controls overall beam divergence by steering the four beams in different directions.

Figure 6:
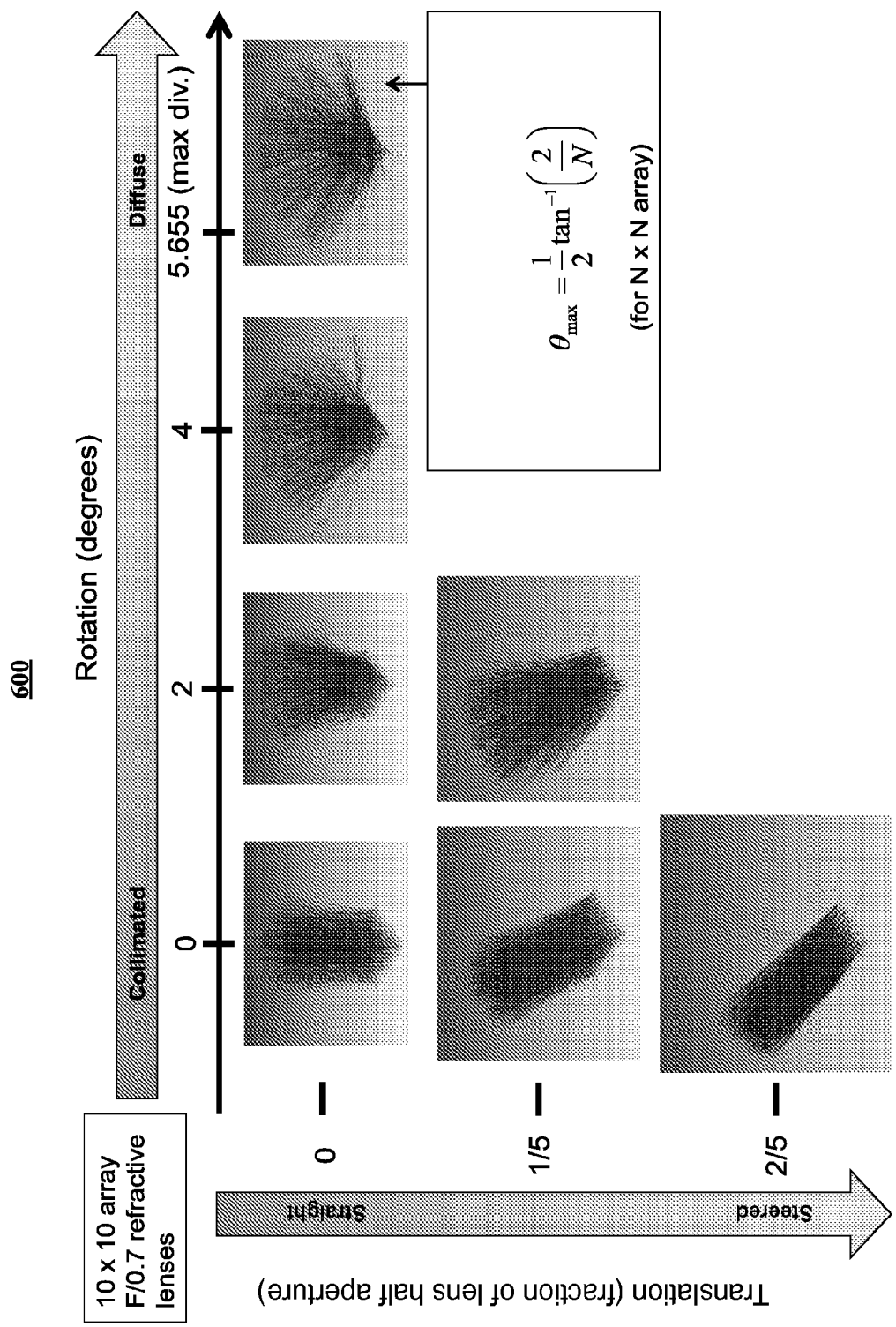
FIG. 6 depicts a resulting beam shape and beam direction as a function of lenslet translation and rotation, in accordance with some example implementations.

FIG. 6 depicts a diagram 600 showing the effect of translating and/or rotating a lenslet array, in accordance with some implementations. The vertical axis labeled "collimated" shows the effect of translating the lenslet array with respect to the ejection features of FIG. 4, reflection points/surfaces of FIGS. 3 and 6, and/or scattering points of FIG. 3. Steering of the individual beams and thus the collection of beams is in the same direction. The amount of steering off boresight is dependent on the amount of translation. The horizontal axis shows the effect of rotating the lenslet array with respect to the decouplers of FIG. 4, reflection points/surfaces of FIGS. 3 and 6, and/or scattering points of FIG. 3. Rotation of the lenslet array may cause different beams in the collection of beams to be steered in different directions so that the collection of beams diverges. The amount of divergence may depend on the amount of rotation.

Figure 7:
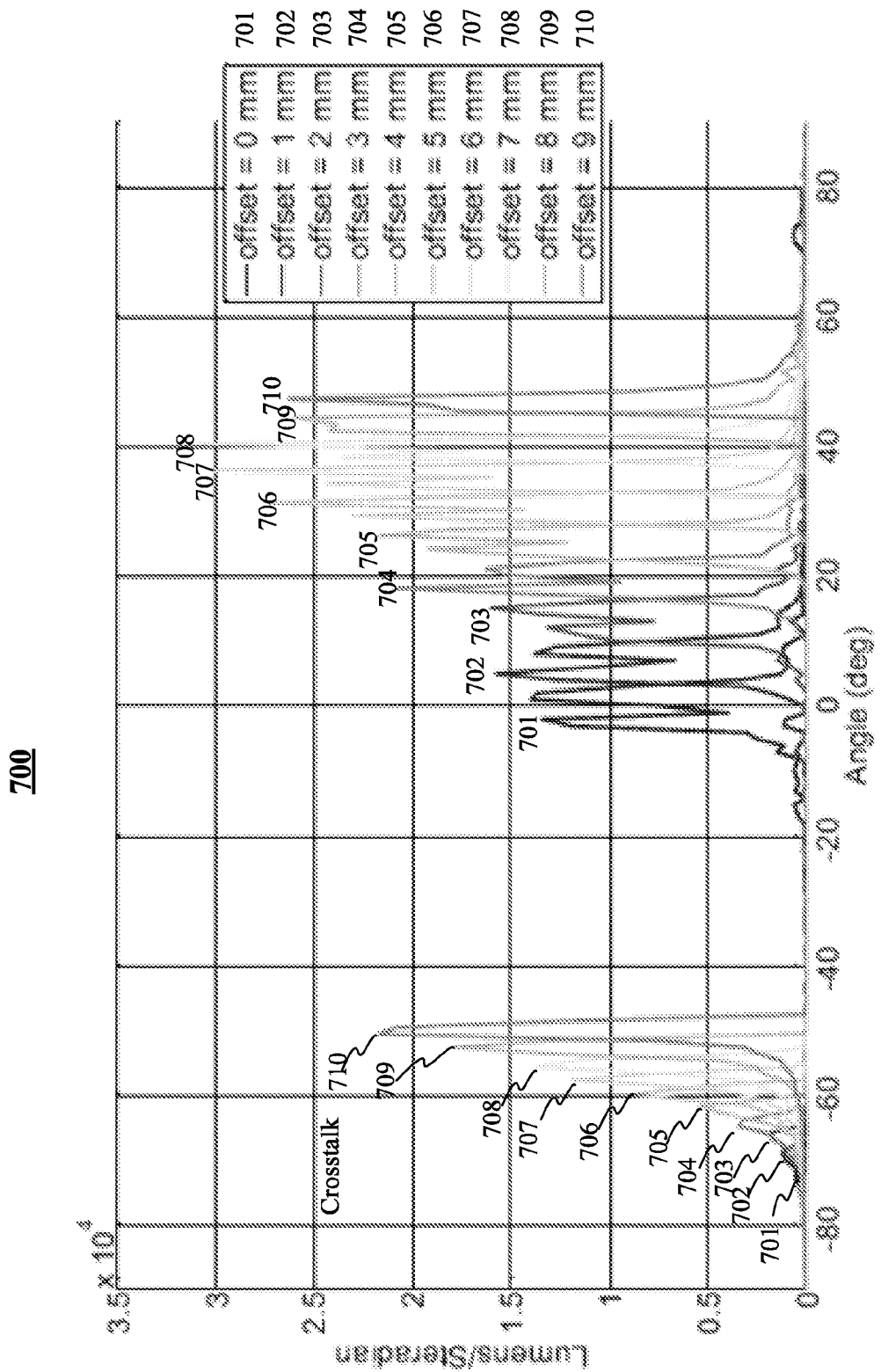
FIG. 7 depicts a beam steering angle and crosstalk as a function of lenslet displacement, in accordance with some example implementations.

FIG. 7 at 700 depicts the luminous intensity of a beam steered by translation of the lenslet array and the crosstalk between lenslets in the array, in accordance with some implementations. As the lenslet array translation (e.g., "offset") increases, the steered angle from boresight increases. As the offset increases, the crosstalk also increases.

Figure 8:
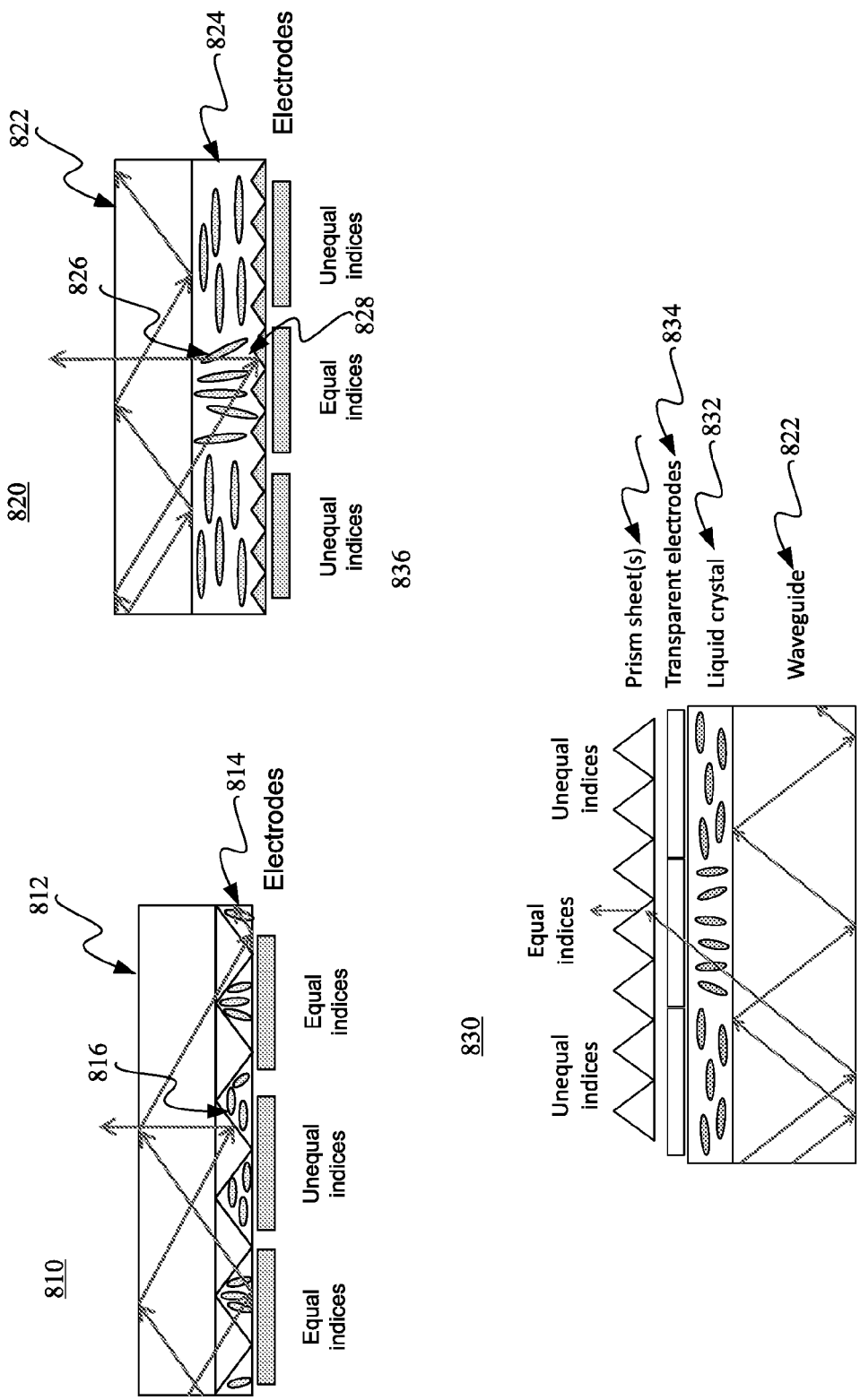
FIG. 8 depicts three spatial light modulators, in accordance with some example implementations.

FIG. 8 depicts two spatial light modulators 810 and 820 in accordance with some implementations. The spatial light modulators 810, 820, and 830 may include variable index medium (e.g. liquid crystal material). Other variable index material may be used as well.

In some implementations consistent with FIG. 8 at 810, a change in refractive index in a material 814 (e.g., liquid crystal material) adjacent to a waveguide 812 may cause ejection of light from the waveguide. For example, reflection of light (or light ejection) may be caused by the refractive index of the liquid crystal being different from the adjacent waveguide material. One of the locations 816 with a different refractive index along the length of the waveguide is shown in 810. In other areas shown at 810, the refractive index of the liquid crystal material may be the same or very similar to the refractive index of the waveguide material. The change in refractive index of the liquid crystal material may be caused by applying a voltage across the material via electrodes.

In some implementations consistent with FIG. 8 at 820, the refractive index of a material adjacent to waveguide 822 such as liquid crystal 824 may be different from the refractive index of waveguide material 822. Light may be confined to the waveguide 822 except at locations where the refractive index of the liquid crystal 824 has been changed to be equal or nearly equal to the refractive index of the waveguide 822 material. At locations such as 826 where the refractive index is changed to being equal or nearly equal to the waveguide material, light may propagate out of waveguide 822 and into the liquid crystal material 824 to redirective surfaces such as surface 828 that may cause reflection (or light ejection) from the waveguide 822. The redirective surfaces may include metalized surfaces, surfaces with refractive index such that total internal reflection occurs, or reflective coatings.

In some implementations consistent with FIG. 8 at 830, the refractive index of a material adjacent to waveguide 822 such as liquid crystal 832 may be different from the refractive index of the waveguide material 822. Light may be confined to the waveguide 822 except at locations where the refractive index of the liquid crystal 832 has been changed to be equal or nearly equal to the refractive index of the waveguide 822 material. At these locations where the refractive index of liquid crystal material 832 may be changed to being equal or nearly equal to the waveguide 822 material, light may propagate out of the waveguide 822, through the liquid crystal material 832 and transparent electrodes 834 to one or more sheets of prisms 836 which may change the directionality of the light propagating out of the waveguide 822. For example, the light propagating out of the waveguide may be substantially perpendicular to the waveguide. The prisms may include refractive prisms, metalized surfaces, or reflective coatings.

Figure 9:
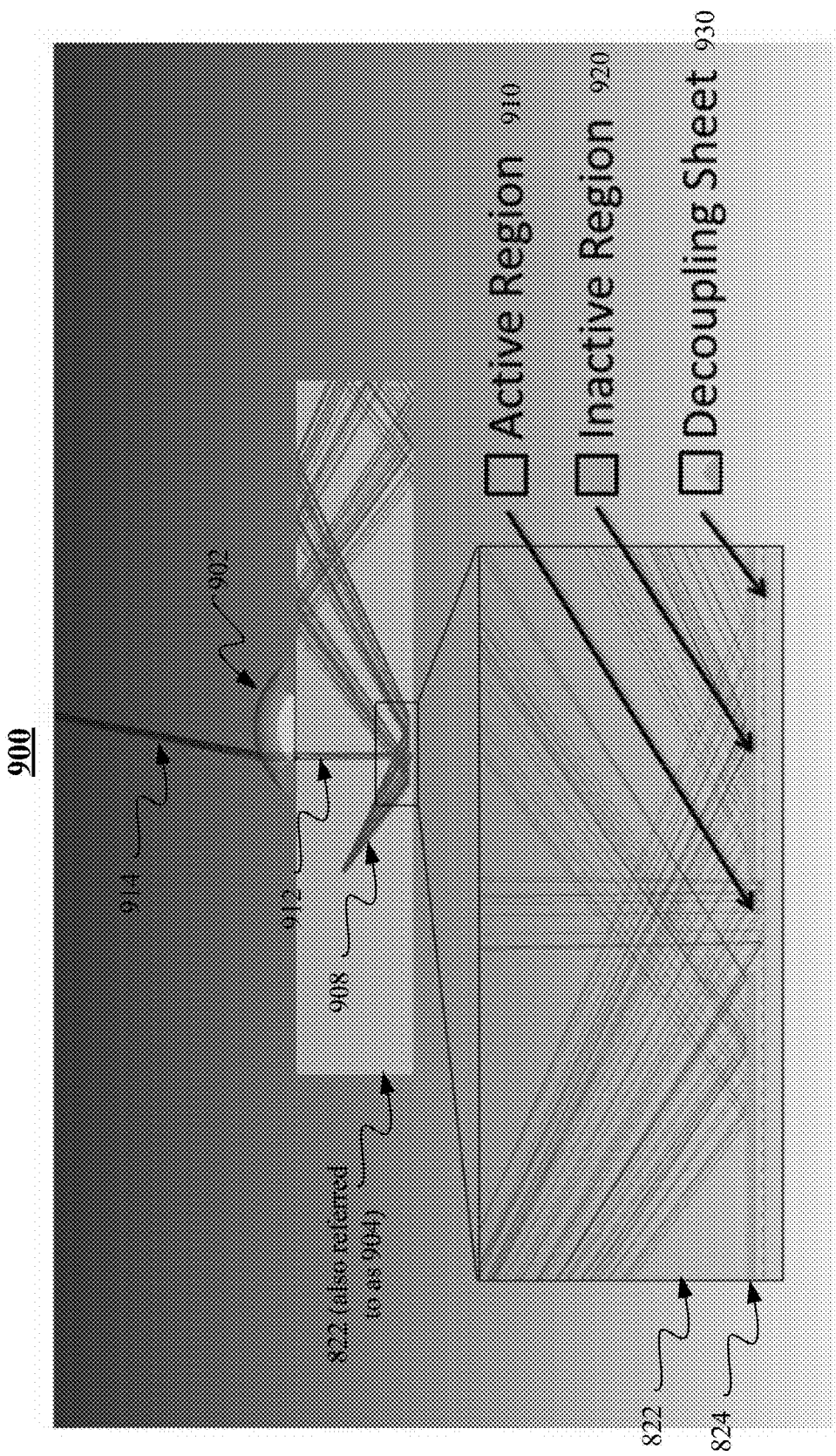
FIG. 9 depicts an apparatus including an active material to steer a beam in a flat panel display providing a controllable viewing direction, in accordance with some example implementations.

FIG. 9 at 900 depicts an optical beam 908 propagating in a waveguide 904. Coupled to the top surface of the waveguide is lens 902 from a lenslet array. Coupled to the bottom surface of the waveguide is active layer 824. Under active layer 824 may be a decoupling sheet 930.

When a portion of the light from beam 908 reaches active layer 824, a portion of the beam is reflected back into the waveguide 822 and a portion passes through the active layer at 910. In some example implementations, active layer 824 may include materials including liquid crystal materials or other materials that change reflectivity, reflection coefficient, or refractive index via a bias voltage across the material. For example, by controlling the reflection coefficient of regions of active layer 824 such as active region 910, light may be allowed to pass through active layer 824 in that region and impinge on a decoupling sheet 930. Decoupling sheet 930 may cause the direction of propagation of the light impinging on decoupling sheet 930 to change to a direction that allows the light to pass towards lens 902 at 912. By controlling the reflection coefficient of regions of the active layer 824 that are small compared to the size of the lens, the location of the effective decoupling feature relative to the lens may be controlled. In some implementations, controlling the position of active region 910 may allow for control of the direction of the outgoing light 914 from lens 902.

In implementations consistent with some displays (e.g., computer monitors, televisions, and so on), an active material (e.g., liquid crystal such as 814 and 824) may separate a waveguide layer (e.g., 812, 822) from a decoupling sheet (e.g., 930). The active material may be divided into individually controllable regions which are each smaller than the area of a single lenslet as detailed with respect to FIG. 9. The transmission/reflection of each region may be set electrically to control the local degree of interaction of guided light with the decoupling sheet. In this way, the position of the effective decoupling feature relative to the lenslet may be controlled for each lenslet. The intensity and direction of emitted light can be tuned for each lenslet and modulated at a frequency dependent on the response time of the active material.

An apparatus consistent with FIG. 9 may be used in a flat panel display to provide a controllable viewing direction when active materials with response times as fast or faster than video frame rates are used. For a given viewing angle and distance, the appropriate lenslet f-number, a small enough sub-pixel pitch, and information about the viewer's location, the system may couple light directly into the viewer's eyes. In some example implementations, light may be independently coupled into each eye of the viewer. In this way, a stereoscopic display may be produced. Each lenslet may convey one pixel, or a localized region of pixels, of the image to each eye. High electrical and optical efficiencies may be achieved compared to conventional displays, because the emitted light is selectively directed straight into the viewer's eyes, as opposed to being emitted in a large solid angle. The selectively aimed light may also make displayed images private to the viewer. In some example implementations, the system may support aiming light to multiple viewers by tracking the locations of each viewer's eyes simultaneously.

Figure 10:
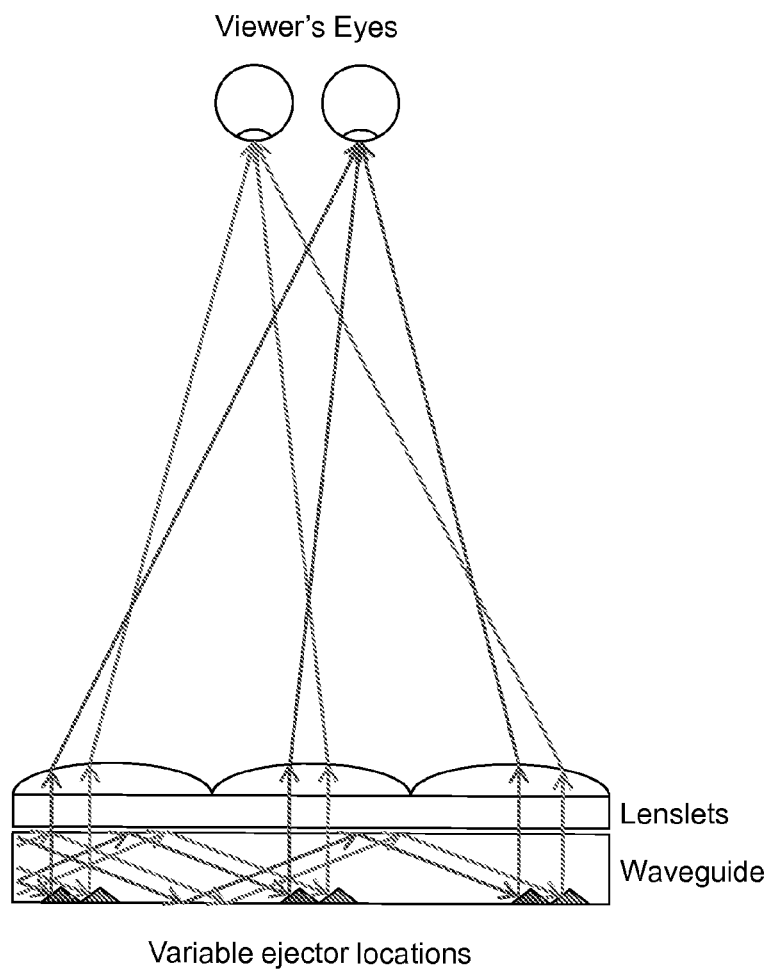
FIG. 10 depicts an example implementation of FIG. 9 providing stereoscopic display to a viewer.

FIG. 10 depicts an example implementation of FIG. 9 providing stereoscopic display to a viewer.

Figure 11:
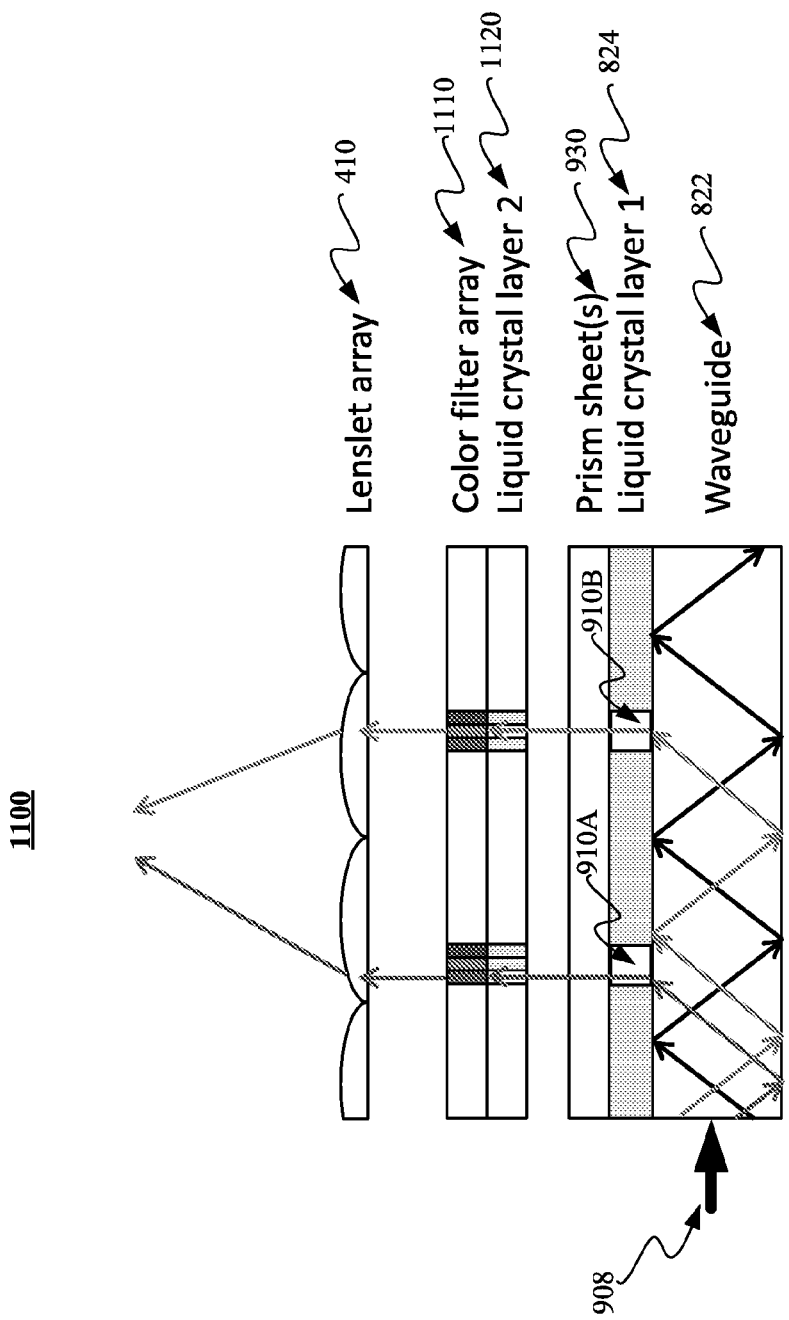
FIG. 11 depicts an apparatus including a first active material to provide a controllable viewing direction, and a second active material to provide color and intensity to output light of a flat panel display, in accordance with some example implementations.

FIG. 11 at 1100 depicts an apparatus including a first active material to provide a controllable viewing direction, and a second active material to provide color and intensity to output light of a flat panel display, in accordance with some example implementations.

At 1100, an optical beam 908 may propagate in a waveguide 904. Coupled to the top surface of the waveguide may be a first liquid crystal layer 824. Coupled to the top surface of the first liquid crystal layer 824 may be a prism sheet 930. Coupled to the top of the prism sheet layer 930 may be a second liquid crystal layer 1120. Coupled to the top surface of the second liquid crystal layer 1120 may be a color filter array 1110. Coupled to the top surface of color filter array 1110 may be a lenslet sheet or array 410. Instead of being coupled to the corresponding adjacent layer(s), one or more of the layers in FIG. 11 may be proximate to the corresponding adjacent layer(s). FIG. 11 also refers to FIGS. 4, 8, 9, and 10.

When a portion of the light from beam 908 reaches first liquid crystal layer 824 (also referred to as an active layer), a portion of the beam may be reflected back into the waveguide 822, and a portion of the beam may pass through the first liquid crystal layer at 910A and 910B. By controlling the reflection coefficient of regions 910A and 910B of first liquid crystal layer 824, light may be allowed to pass through active layer 824 at 910A and 910B and impinge on a prism sheet 930 (also referred to as a decoupling sheet). Prism sheet 930 may cause the direction of propagation of the light impinging on prism sheet 930 to change to a direction that allows the light to pass towards second liquid crystal layer 1120. Although FIG. 11 appears to show the light passing through liquid crystal sheet 824 changing direction at the liquid crystal sheet 824, the light changes direction at the prism sheet 930. By controlling the reflection coefficient of regions of the second liquid crystal layer 1120 that are small compared to the size of regions 910A and 910B, and thus the light passing through 910A and 910B, the locations where color filter array 1110 are illuminated may be selected. Color filter array 1110 may include a pattern of regions of different colors. By illuminating specific locations of color filter array 1110, the color of the light directed towards lenslet array 410 may be controlled.

An apparatus consistent with FIG. 11 may be used to provide a color flat panel display with a controllable viewing direction. Each lenslet in 410 may convey one color pixel, or a localized region of color pixels, of the image to each eye.

In accordance with some implementations, an apparatus comprises: a waveguide layer to guide an optical beam; a lenslet layer, coupled to a surface of the waveguide layer, to focus a portion of the optical beam decoupled from the waveguide layer; a first active layer, coupled to another surface of the waveguide layer, to allow the portion of the optical beam to decouple from the waveguide layer by passing through the first active layer in at least one selectable region of the first active layer; a redirecting layer, coupled to or proximate to the first active layer, to redirect the portion of the optical beam decoupled from the waveguide towards the lenslet layer; and a second active layer and corresponding color filter array to provide color selection and intensity control of the portion of the optical beam decoupled from the waveguide layer.

The subject matter described herein may be embodied in systems, apparatus, methods, and/or articles depending on the desired configuration. For example, apparatuses and/or processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein. For example, the control aspects of the light sources or display such as a liquid crystal display may include non-transitory computer-readable medium including computer program code for the control. Moreover, the design or optimization of the design of the light sources or liquid crystal display may include non-transitory computer-readable medium including computer program code for the design or optimization.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other implementations may be within the scope of the following claims. Furthermore, the specific values provided in the foregoing are merely examples and may vary in some implementations.

Although various aspects of the invention are set out in the claims, other aspects of the invention comprise other combinations of features from the described implementations with the features of the claims, and not solely the combinations explicitly set out in the claims.

It is also noted herein that while the above describes example implementations of the invention, these descriptions should not be viewed in a limiting sense. Rather, there are several variations and modifications that may be made without departing from the scope of the present invention as defined in the appended claims.

What is claimed is:

1. A display comprising:
  a waveguide layer to guide an optical beam;
  a first active layer, coupled to a surface of the waveguide layer, to allow a portion of the optical beam to decouple from the waveguide layer by passing through the first active layer in at least one selectable region of the first active layer; and
  a redirecting layer, coupled to or proximate to the first active layer, to redirect the portion of the optical beam decoupled from the waveguide layer towards a lenslet layer to output the portion of the optical beam.

2. The display of claim 1, further comprising:
  a second active layer to receive the portion of the optical beam redirected by the redirecting layer and to select an intensity of the portion of the optical beam decoupled from the waveguide layer.

3. The display of claim 2, wherein the second active layer further selects a color from a color filter array for the portion of the optical beam decoupled from the waveguide layer.

4. The display of claim 1, wherein the redirected portion of the optical beam decoupled from the waveguide layer is steered in a predetermined direction by adjusting the at least one selectable region of the first active layer.

5. The display of claim 2, wherein one or more of the first active layer and the second active layer comprises a liquid crystal material.

6. The display of claim 1, wherein the redirecting layer comprises prism decouplers.

7. The display of claim 1, wherein the lenslet layer comprises a plurality of lenses configured in an array.

8. The display of claim 7, further comprising:
  a face tracker to determine at least a direction from one of the plurality of lenses to an eye of a user.

9. The display of claim 1, wherein the display comprises a liquid crystal display.

10. The display of claim of claim 1, wherein the lenslet layer collimates, or substantially collimates, the portion of the optical beam provided by the waveguide layer.

* * * * *